United States Patent
Krummen et al.

(10) Patent No.: US 12,543,996 B2
(45) Date of Patent: Feb. 10, 2026

(54) HEART WALL REFINEMENT OF ARRHYTHMIA SOURCE LOCATIONS

(71) Applicants: The Vektor Group, Inc., San Diego, CA (US); The Regents of the University of California, Oakland, CA (US)

(72) Inventors: David E. Krummen, San Diego, CA (US); Robert Joseph Krummen, Bellevue, WA (US); Christopher J. T. Villongco, San Diego, CA (US)

(73) Assignees: THE VEKTOR GROUP, INC., San Diego, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 19/121,131

(22) PCT Filed: Aug. 1, 2024

(86) PCT No.: PCT/US2024/040474
§ 371 (c)(1),
(2) Date: Apr. 15, 2025

(87) PCT Pub. No.: WO2025/029981
PCT Pub. Date: Feb. 6, 2025

(65) Prior Publication Data
US 2025/0325218 A1 Oct. 23, 2025

Related U.S. Application Data

(60) Provisional application No. 63/516,911, filed on Aug. 1, 2023.

(51) Int. Cl.
*A61B 5/367* (2021.01)
*A61B 5/341* (2021.01)
(Continued)

(52) U.S. Cl.
CPC .............. *A61B 5/367* (2021.01); *A61B 5/341* (2021.01); *A61B 5/364* (2021.01); *G16H 10/60* (2018.01);
(Continued)

(58) Field of Classification Search
CPC .......... A61B 5/367; A61B 5/341; A61B 5/364
See application file for complete search history.

(56) References Cited

U.S. PATENT DOCUMENTS

| 4,754,753 A | 7/1988 | King |
| 5,480,422 A | 1/1996 | Ben-Haim |

(Continued)

FOREIGN PATENT DOCUMENTS

WO 2024173270 A2 8/2024

OTHER PUBLICATIONS

International Search Report and Written Opinion received in Application No. PCT/US24/40474, dated Oct. 21, 2024, 11 pages.
(Continued)

*Primary Examiner* — John R Downey
(74) *Attorney, Agent, or Firm* — Perkins Coie LLP

(57) ABSTRACT

A method for localizing the source of an arrhythmia within a heart wall is disclosed. The method involves accessing an indication of the source location of the arrhythmia within the endocardium. A normal vector is generated that is normal to the endocardium at the source location in the direction of the epicardium layer. An activation vector indicating the direction of electrical force of the heart during an initial stage of depolarization is determined. The depth angle between the normal vector and the activation vector is determined, and the depth of the source location within the heart wall is indicated based on a depth angle.

28 Claims, 13 Drawing Sheets

(51) Int. Cl.
*A61B 5/364* (2021.01)
*G16H 10/60* (2018.01)
*G16H 30/40* (2018.01)
*G16H 50/20* (2018.01)
*G16H 50/50* (2018.01)

(52) U.S. Cl.
CPC ............ *G16H 30/40* (2018.01); *G16H 50/20* (2018.01); *G16H 50/50* (2018.01)

(56) References Cited

U.S. PATENT DOCUMENTS

| | | |
|---|---|---|
| 6,285,898 B1 | 9/2001 | Ben-Haim |
| 2009/0012510 A1 | 1/2009 | Bertolero et al. |
| 2012/0157822 A1 | 6/2012 | Van et al. |
| 2017/0042449 A1 | 2/2017 | Deno et al. |
| 2019/0125186 A1 | 5/2019 | Ruppersberg |
| 2019/0200886 A1 | 7/2019 | Welsh et al. |
| 2020/0375555 A1* | 12/2020 | Cohen ............ A61B 5/339 |
| 2021/0059550 A1* | 3/2021 | Urman ............ A61B 5/287 |
| 2021/0244340 A1* | 8/2021 | Yomtov ............ A61B 90/37 |
| 2021/0378512 A1 | 12/2021 | Ruppersberg |
| 2022/0133207 A1 | 5/2022 | Villongco |

OTHER PUBLICATIONS

Van Dam et al. "Non-invasive imaging of cardiac activation and recovery." Annals of biomedical engineering 37 (2009): 1739-1756. Retrieved on Oct. 11, 2024 (Oct. 11, 2024) from <https://link.springer.com/content/pdf/10.1007/sl0439-009-9747-5.pdf>.

Roney et al. An automated algorithm for determining conduction velocity, wavefront direction and origin of focal cardiac arrhythmias using a multipolar catheter., In 36th Annual International Conference of the IEEE Engineering in Medicine and Biology Society, EMBC 2014, Chicago, IL, USA, Aug. 26-30, 2014. pp. 1583-1586, IEEE, 2014. [doi].

Salinet et al. "Electrocardiogramaging for atrial fibrillation: a perspective from computer models and animal experiments to clinical value." Frontiers in physiology 12 (2021): 653013., Retrieved on Oct. 11, 2024 (Oct. 11, 2024) from <https://www.sci.utah.edu/publications/Sal2021a/ElectrocardiogramagingforAtrialFibrillationAPerspectiveFromComputerModelsandAnimalExperimentstoClinicalValue_fphys-12-653013.pdf> entire document.

* cited by examiner

HEART WALL REFINEMENT OF ARRHYTHMIA SOURCE LOCATIONS

CROSS-REFERENCE TO RELATED APPLICATION

This application claims the benefit of U.S. Provisional Application No. 63/516,911 titled "Heart Wall Refinement of Arrhythmia Source Locations" and filed on Aug. 1, 2023, which is hereby incorporated by reference.

BACKGROUND

Many heart disorders can cause symptoms, morbidity (e.g., syncope or stroke), and mortality. Common heart disorders caused by arrhythmias include inappropriate sinus tachycardia (IST), ectopic atrial rhythm, junctional rhythm, ventricular escape rhythm, atrial fibrillation (AF), ventricular fibrillation (VF), focal atrial tachycardia (focal AT), atrial microreentry, ventricular tachycardia (VT), atrial flutter (AFL), premature ventricular complexes (PVCs), premature atrial complexes (PACs), atrioventricular nodal reentrant tachycardia (AVNRT), atrioventricular reentrant tachycardia (AVRT), permanent junctional reciprocating tachycardia (PJRT), and junctional tachycardia (JT). The sources of arrhythmias may include electrical rotors (e.g., ventricular fibrillation), recurring electrical focal sources (e.g., atrial tachycardia), anatomically based reentry (e.g., ventricular tachycardia), and so on. These sources are important drivers of sustained or clinically significant arrhythmia episodes. Arrhythmias can be treated with ablation using different ablation technologies, including pulsed field ablation (PFA), radiofrequency energy ablation (RFA), other electromagnetic energy ablation, cryoablation, ultrasound ablation, laser ablation, external radiation sources, directed gene therapy, and so on by targeting the source of the heart disorder. Since the sources of heart disorders and the locations of the source vary from patient to patient, even for common heart disorders, targeted therapies require the source of the arrhythmia to be identified.

Unfortunately, common methods (e.g., a mapping procedure) for reliably identifying the source location of a heart disorder can be complex, cumbersome, and expensive. For example, one method uses an electrophysiology catheter having a multi-electrode basket catheter that is inserted into the heart (e.g., left ventricle) intravascularly to collect from within the heart measurements of the electrical activity of the heart, such as during an episode of VF or PVCs. The measurements can then be analyzed to help identify a possible source location. Another method uses an exterior body surface vest with electrodes to collect measurements from the patient's body surface, which can be analyzed to help identify an arrhythmia source location. However, body surface vests are expensive, complex, and difficult to manufacture, and may interfere with the placement of defibrillator pads needed after inducing ventricular fibrillation to collect measurements during the arrhythmia. In addition, the vest analysis requires a computed tomography (CT) scan and is unable to sense the interventricular and interatrial septa where approximately 20% of arrhythmia sources may occur.

When developing a treatment plan for a patient, it can be important to determine the depth of the source within the heart wall. For example, the source may be within the endocardium, myocardium (e.g., midline), or epicardium. An arrhythmia with an endocardial source may be treated using an ablation catheter that is guided through a heart chamber to the source location. An arrhythmia with an epicardial source may be treated with an ablation catheter that is guided to the source location using a percutaneous subxiphoid approach or a intravascular approach. With an endocardial source or a epicardial source, when the catheter tip is in contact with the heart wall the tissue is ablated. An arrhythmia with a myocardial source may be treated with an ablation catheter using endocardial access or epicardial access. With a myocardial source, the ablation catheter is moved so that the catheter tip is in contact with the endocardium or epicardium. The catheter tip is inserted into the myocardium and moved to a certain depth which is thought to be the myocardial source location. The tissue at that depth is then ablated.

When the depth is known, the treatment plan specifies whether the treatment is to be based on endocardial access (e.g., with an intracardiac catheter) or epicardial access (e.g., with a radiofrequency ablation catheter using a percutaneous subxiphoid or intravascular approach).

Various techniques may be employed to determine the depth of a source, a common practice during an ablation procedure is to first map the endocardial surface of the heart and attempt an ablation via endocardial access. If the endocardial map shows a low correlation to the arrhythmia or if the ablation is unsuccessful, only then will epicardial access be attempted. Oftentimes, however, the procedure will be ended and an ablation procedure via epicardial access will be scheduled for another time (e.g., another day), which is both costly and delays effective treatment.

DETAILED DESCRIPTION

Figure 1:
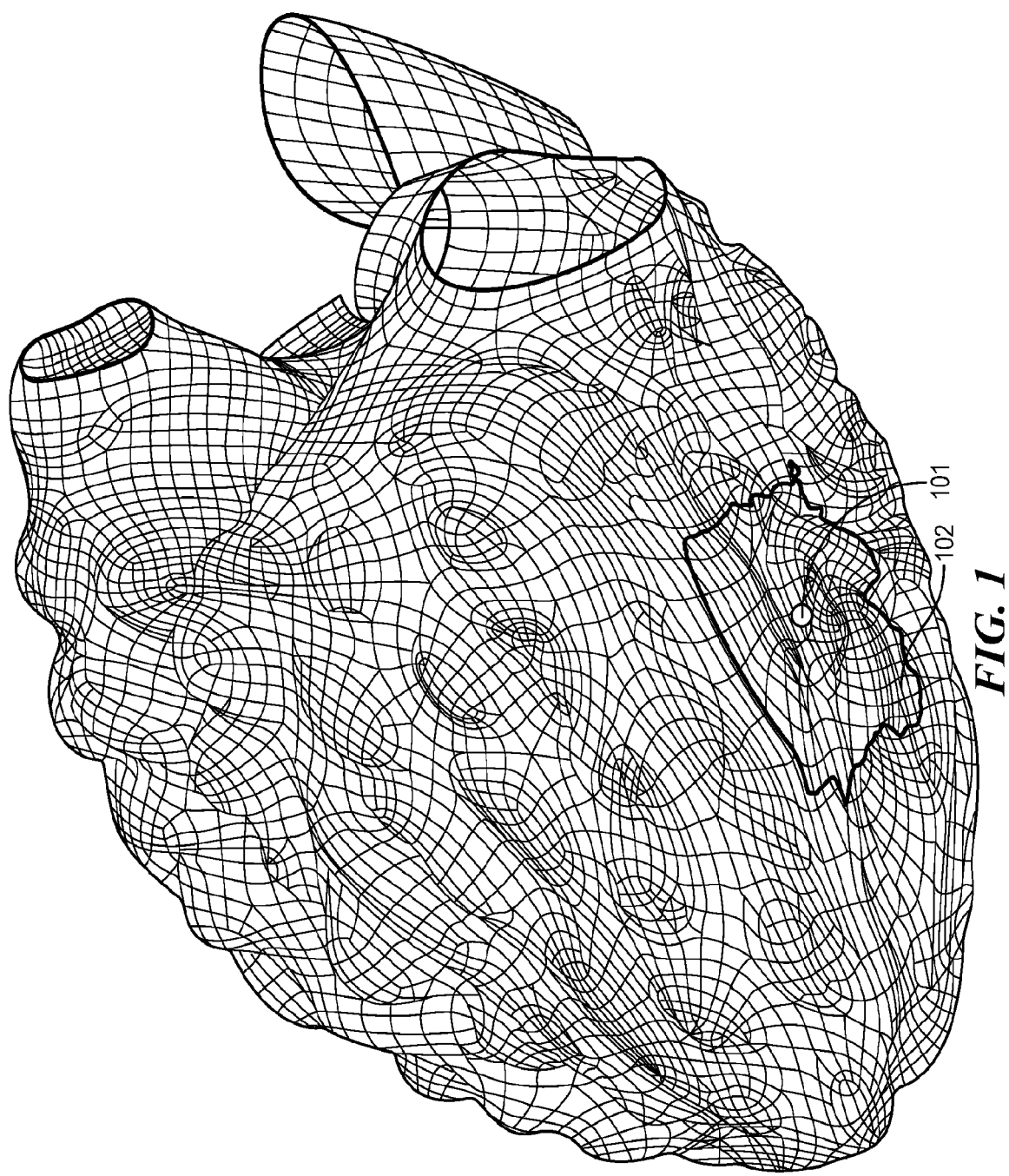
FIG. 1 is a graphic of a heart that illustrates a source location.

Methods and systems are provided to refine an initial source location of the source of an arrhythmia to a refined source location. The initial source location may be within the endocardium even though the actual source location may be within the epicardium. In such a case, the initial source location is refined to a refined source location within the epicardium. The refined source location represents the actual source location more accurately than the initial source location represents the actual source location. Because the refined source location is a more accurate representation, the treatment of a patient is more informed and may have a more positive outcome than if the treatment was based on the initial source location. The more positive outcome may result from reduced ablation procedure time, increased chance of terminating the arrhythmia, reduced need for a subsequent ablation procedure, and so on.

In some embodiments, a source location refinement (SLR) system refines an initial source location of an arrhythmia (e.g., VT) to a refined source location that factors in an activation depth within the heart wall that may be determined based on the direction of the electrical potential of cardiac tissue at or near the beginning of activation (e.g., depolarization), referred to as the activation time. The refined source location may be specified as the combination of the initial source location and the activation depth. The refined source location may be considered at the activation depth along a line from the initial source location to the point on the opposite side of the heart wall that satisfies a nearness criterion (e.g., nearest point).

The initial source location may be a location within the endocardium or epicardium even though the actual source location may be in the endocardium, myocardium, or epicardium. Given an initial source location that is within, for example, the endocardium, the SLR system calculates a normal vector that is normal to the endocardium, which may be in the direction of the epicardium, with an origin (referred to as a normal origin) at the initial source location. The SLR system also identifies an activation vector based on the direction of the electrical potential at the activation time. The activation vector may be derived from the direction at a time (e.g., 20 ms or user selected) that is early within QRS complex of a vectorcardiogram (VCG) generated from an electrocardiogram (ECG) collected from the patient during an arrhythmia episode. The SLR system calculates the angle, referred to as the depth angle, between the normal vector and the activation vector. The depth angle indicates the activation depth of the source within the heart wall relative to endocardium. The activation depth may be represented as a percentage of the distance from the initial source location to the epicardium in the direction of the normal vector. The activation depth may be calculated as the depth angle divided by 180 degrees with the result multiplied by 100 to give a percentage (i.e., (depth angle/180)*100).

If the activation depth is 100%, activation may be considered to propagate from the epicardium to the endocardium and likely originates in the epicardium. If the activation depth is 0%, activation may be considered to propagate from the endocardium to the epicardium and likely originates in the endocardium. If the activation depth is near 50%, activation may be considered to propagate radially or semi-circularly from the midline myocardium and likely originates in the midline myocardium. When the source location is within the myocardium, the activation vector represents the sum of vectors in the directions of electrical potentials as activation spreads through the myocardium. For example, if the source is a reentrant circuit at the midline myocardium, as the electrical potential exits the isthmus of the reentrant circuit at the actual source location, the sum of the vectors may be an activation vector that is perpendicular to the normal vector. A vector that is antiparallel to the activation vector is referred to as an isthmus vector. An isthmus vector is in the direction of the isthmus. The isthmus vector and the refined source location (e.g., exit site of the isthmus) may be used to determine a target location for an ablation. The ablation may start at the refined source location and proceed in the direction of the isthmus vector.

In some embodiments, the SLR system may refine an initial source location to be either endocardial or epicardial based on a depth angle cutoff. The depth angle cutoff may be based on QRS complexes collected during endocardial pacing and epicardial pacing. The QRS complexes may be derived from electronic health records (EHRs) of a collection of patients or from those collected from the patient. For each endocardial QRS complex and epicardial QRS complex, the SLR system calculates the depth angle. The SLR system then generates an endocardial mapping (representing a graph or receiver operating characteristics curve) of depth angles to the count of QRS complexes having each depth angle and an epicardial mapping of depth angles to the count of QRS complexes having each depth angle. The SLR system may set the depth angle cutoff to the depth angle based on the intersection of the mappings (e.g., where the number of endocardial counts and epicardial counts are the same).

Although the SLR system is primarily described based on an initial source location that is in the endocardium, the initial source location may alternatively be considered to be in the epicardium. In such a case, the SLR system performs similar processing but assumes the normal origin is in the epicardium and the normal vector is in the direction of the endocardium. The initial source location may also be considered to be in the midline myocardium (or other location is the myocardium). In such a case, the SLR system performs similar processing but assumes that the normal origin is in the midline myocardium and that the normal vector is perpendicular to a location on either the endocardium or the epicardium that is closest to the normal origin.

After determining the refined source location, the SLR system may output an indication of the refined source location. For example, the SLR system may display a graphic illustrating the normal vector and the activation vector. The graphic may include a representation of the patient's heart along with indications of the vectors. The vectors may be translated to have the same origin to assist in visualizing the depth angle. The SLR system may also display the numerical value of the depth angle. As another example, the SLR system may display a graphic of the patient's heart that includes an arrow representing the normal vector with a magnitude that illustrates the activation depth. The graphic also illustrates the refined source location. A medical provider can develop a treatment plan based on the refined source location such as determining whether to employ an endocardial or epicardial access for an ablation. The medical provider may also determine what treatment technology to employ such as radiofrequency energy ablation, pulsed field ablation, cryoablation, ultrasound ablation, laser ablation, external radiation sources, other electromagnetic energy ablation, directed gene therapy, and so on by targeting based on the refined source location. The SLR system may also output the refined source location to an ablation planning device or an ablation therapy device such as a stereotactic radiation therapy device.

In some embodiments, the SLR system may specify the activation depth as a quantized activation depth with values of endocardial or epicardial or values of endocardial, midline myocardial, and epicardial rather than as a percentage. To determine the quantized activation depth, the SLR system may employ an endocardial, midline myocardial, or epicardial quantization criterion. The endocardial quantization criterion may be that the depth angle is less than 60 degrees, the midline myocardial quantization criterion may be that the depth angle is between 60 degrees and 120 degrees, and the epicardial quantization criterion may be that the depth angle is greater than 120 degrees.

The SLR system may be provided with a source location by a source location identification system (e.g., based on a forward-solution mapping process) that identifies a source location based on a cardiogram such as an ECG collected from a patient or a VCG derived from the ECG. Such a source location identification system is described in U.S. Pat. No. 10,856,816 titled "Machine Learning Using Simulated Cardiograms" and issued on Dec. 8, 2020, which is hereby incorporated by reference. Such a source location identification system, however, may not distinguish between endocardial or epicardial source locations but rather simply provide an endocardial source location even though the source may be an epicardial source. The SLR system may also be provided with an initial source location based on an anatomical mapping system that identifies a source location based on an anatomical mapping of a patient's heart, for example, using a catheter.

Given such an initial source location, the SLR system may generate a normal vector in various ways. For example, the normal vector may be generated based on a segmentation of a CT image of the patient's heart with the initial source location indicated. The direction of the endocardium at that initial source location is determined from the segmentation, and the normal vector is perpendicular to that direction in the direction of the epicardium. As another example, the normal vector may be in the direction of the catheter tip at time of activation of the arrhythmia during the anatomical mapping. As another example, the normal vector may be determined based on analysis of a three-dimensional (3D) mesh representing the patient's heart. The vertices of the 3D mesh represent locations within the heart wall. Such a 3D mesh of a heart may be generated from the CT image of the patient's heart. The normal vector may be perpendicular to a face of the 3D mesh nearest the initial source location (e.g., corresponding to a vertex of the 3D mesh). A collection of adjacent vertices (e.g., three vertices) specifies a face of the 3D mesh representing locations within the endocardium. The SLR system identifies the face that includes the initial source location and sets the normal vector to be perpendicular to that face. Techniques for generating such a 3D mesh are described in Int. Pub. No. WO 2023/0168017 titled "Overall Ablation Workflow System" and published on Sep. 7, 2023, which is hereby incorporated by reference. The SLR system may employ techniques described in the '017 application to adjust a source location (initial or refined) that is relative to a generic cardiac geometry to be relative to a patient-specific cardiac geometry.

Rather than employing a single initial source location, the SLR system may identify multiple initial source locations that are each based on a different QRS complexes of the patient's ECG. For example, the SLR system may determine the initial source locations associated with 60 QRS complexes. The SLR system may aggregate (using an averaging technique) those initial source location into a single initial source location for further processing. Alternatively, the SLR system may process each initial source location individually to generate multiple refined source locations.

In some embodiments, the SLR system displays a 3D graphic derived from a 3D mesh of heart that is, for example, based on a generic or a patient-specific cardiac geometry. The 3D graphic may include a "hotspot" that indicates a collection of refined source locations (corresponding to vertices of the 3D mesh) derived from different QRS complexes. The hotspot may use highlighting (e.g., shading or different colors) to indicate areas with greater concentrations of refined source locations within the heart wall. The 3D graphic may represent different sublayers of layers of the heart wall. The layers of a heart wall include the endocardium, myocardium, and epicardium. The myocardium may have, for example, 16 sublayers spanning the thickness of the myocardium. When a 3D graphic is generated based on the 3D mesh, a sublayer may be displayed to illustrate a myocardial source location. When different sublayers are selected for display by a user, the user may analyze the sublayers to assess depth of the myocardial source. In addition, the SLR system may also display a 2D graphic representing a slice of the 3D graphic. Such a 2D graphic represents all the sublayers of the myocardium that may illustrate a hotspot within the myocardium. The SLR system provides a user interface to allow selection of a sublayer or a slice that is to be displayed. A slice may be indicated by an azimuthal angle and a polar angle.

In some embodiments, a source location identification system may be based on simulations of electrical activity of hearts with different heart configurations, for example, as described in the '816 patent. For each heart configuration, multiple simulations may be performed assuming different source locations throughout the heart wall including endocardial and epicardial source locations. A simulated VCG corresponding a simulated ECG may be generated for each simulation and mapped to the source location of that simulation. To determine the source location given a patient VCG, the source location identification system identifies simulated VCGs that are similar to the patient VCG that satisfy a similarity criterion. Because a VCG for an endocardial source and an epicardial source that are near each other may be very similar, many simulated VCGs may be identified. To determine the activation vector, the SLR system may compare a QRS complex of each similar simulated VCG to the QRS complex of the patient VCG. The SLR system selects the most similar QRS complex of a simulated VCG. The SLR system sets the activation vector to originate from the source location associated with that simulated VCG and be in the direction of the initial portion of that simulated VCG. If the activation vector points toward the endocardium, the source location is considered to be epicardial. If the activation vector points toward the epicardium, the source location is considered to be endocardial.

In some embodiments, the simulations may be particularly useful for regions of the heart with irregular geometries. Regions with irregular geometries include the septal ventricular outflow tract, the papillary muscles, or the moderator band. The assumptions that are appropriate for regions of regular geometries such as that of cardiac segment 11 may not be appropriate for regions of irregular geometries. For example, an initial source location may be on a papillary muscle. However, the actual source location is likely within the papillary muscle and a refinement technique based on a normal vector may not be helpful in refining the initial source location. Instead of computing a normal vector, the SLR system calculates voltage solutions based upon an arrhythmia simulation originating from the identified site for either or both: endocardial and epicardial activation. The SLR system then selects endocardial or epicardial based on similarity between the initial portions of the simulated VCGs derived from the simulations to the initial patient VCG. If the initial portion derived from the endocardial simulation is more similar, then the source location is considered to be endocardial, else the source location is considered to be epicardial.

In some embodiments, the SLR system precomputes normal vectors for various cardiac geometries rather than calculating them dynamically. For example, normal vectors may be computed for various endocardial locations of each cardiac geometry represented by a 3D mesh. Precomputed normal vectors may be calculated for endocardial locations corresponding to the vertices of the 3D mesh. For each cardiac geometry, the SLR system stores the precomputed normal vectors for that cardiac geometry in a normal vector table associated with that cardiac geometry. That normal vector table maps the endocardial locations of the cardiac geometry to the precomputed normal vectors. To identify a normal vector for a patient, the SLR system identifies a cardiac geometry based on similarity to the patient's cardiac geometry. Based on the identified cardiac geometry and an initial source location, the SLR system identifies, from the normal vector table associated with the identified cardiac geometry, an endocardial location based on proximity to the initial source location. The SLR system selects the precomputed normal vector associated with the identified endocardial location and uses that precomputed normal vector in place of a dynamically calculated normal vector.

As described above, the activation vector may be derived from the direction of a VCG at an activation time that is early within the QRS complex of an ECG from which that VCG is generated. The SLR system may employ various techniques for determining the activation time relative to a start time of the QRS complex. One technique may employ a fixed activation time (e.g., 20 ms) or a user selected activation time (e.g., 30 ms). Another technique may employ a variable activation time that is a certain percentage (e.g., 50%) of the interval from the start time to the time of the max slope (dV/dt) of the R wave or a certain percentage (e.g., 25%) of the interval from the start time to the peak of the R wave. The percentage for the variable activation time may be a fixed percentage or selected by a user.

The fixed activation time and the fixed percentage for the variable activation time may be determined in various ways. For example, the fixed activation time and the fixed percentage may be determined based on a sensitivity analysis. The sensitivity analysis may be based on clinical data derived from EHRs. The clinical data may include, for each EHR, an ECG, an ablation location of a successful ablation, and a CT image. For each EHR, the sensitivity analysis identifies an initial source location based on the ECG using a source location identification system and determines a normal vector with an origin at the initial source location based on a CT image. The sensitivity analysis generates a VCG from the ECG. Given the normal vectors and the VCGs, the sensitivity analysis identifies a fixed activation time or a fixed activation percentage that tends to maximize the sensitivity and specificity of refinement. The sensitivity analysis may employ a gradient descent technique that repeatedly adjusts the fixed activation time or the fixed activation percentage and calculates the refinement. The sensitivity analysis may employ a similar technique to determine the start time. The start time and the fixed activation time or fixed activation percentage may also be determined simultaneously by minimizing the differences based on adjusting both the start time and the fixed activation time or fixed activation percentage.

The sensitivity analysis may employ other automated systems to identify a start time of a QRS complex using machine learning (ML) or non-ML techniques based on clinical data. The clinical data includes ECGs and start times of QRS complexes used in identifying source locations of successful ablations. The source locations may be identified by a source location identification system. Such an automated system inputs a QRS complex whose start time may be manually or automatically selected from an ECG. The automated system outputs the refined start time. Such an automated system is described in Int. Pub. No. WO 2024/044719 titled "Automatic Refinement of Electrogram Selection" and published Feb. 29, 2024, which is hereby incorporated by reference.

In some embodiments, the SLR system may employ various ML models to identify a normal vector, activation vector, and/or depth of a source location. The ML models may be trained using clinical data or simulated data. The training data for an ML model is a collection of inputs labeled with the outputs of the ML model (as described below). The clinical data may be based on ablation procedures at a known ablation location that resulted in terminating an arrhythmia. The simulated data may be generated by running simulations of electrical activity of a heart assuming various epicardial source locations and cardiac characteristics (e.g., geometry and electrical such as action potential). (e.g., endocardial, myocardial, and epicardial.). A simulated ECG may be generated based on the simulated electrical activity of each simulation. For each simulation, a normal vector, activation vector, depth, and refined source location may be calculated. The simulated ECGs may be mapped to the corresponding epicardial source location, a normal vector, activation vector, depth, and refined source location. The ML models may be based on various ML architectures as described below. Rather than employing an ML model, the simulated data may be employed to determine a refined source location by identifying a simulated ECG that is similar to a patient ECG and selecting the refined source location to which that simulated ECG is mapped as the refined source location for the patient.

A normal vector ML model may input a feature vector with a feature representing a QRS complex and a feature representing a cardiac geometry and may output a normal vector with its origin at the endocardium or the epicardium. The feature vector may have a feature representing an endocardial or epicardial location rather than a feature derived from a QRS complex. The feature representing a cardiac geometry may be derived from a 3D mesh, a CT image, or a standard segmentation.

A activation vector ML model may input a feature vector with a feature derived from a QRS complex and a feature representing a normal vector and outputs an activation vector. Rather than inputting a feature representing a normal vector, an activation vector ML model may input a feature derived from a 3D mesh, a CT image, or a standard segmentation.

A depth ML model may input a feature vector with a feature derived from a QRS complex and a feature derived from a 3D mesh, a CT image, or a standard segmentation and output a depth. Rather than inputting such features, the depth ML model may input a feature representing a normal vector and a feature representing a activation vector. These features may be generated by the normal vector ML model and the activation vector ML model.

A refined source location ML model may input features derived from a patient ECG and output a refined source location. A feature that is "derived from" certain data (e.g., ECG) may include the data itself.

The 3D graphic of the heart may be generated from a 3D image (e.g., CT scan) of the patient's heart. The SLR system may employ the Blender open-source system to generate, display, and rotate the graphic. (Blender Foundation, Blender, version 2.93, Blender, 2023. [Online]. Available: https://www.blender.org/.) Various techniques for generating a 3D graphic and for augmenting the 3D graphic with a source location that is an origin of electrical activation are described in '017 patent publication.

FIG. 1 is a graphic of a heart that illustrates a source location. The initial source location 101 (dark circular area) is illustrated as being in the mid-lateral left ventricle 102 (gray area) and specifically within cardiac segment 11 which is referred to as the left ventricular mid inferolateral region. (The cardiac segments are defined by the American Heart Association.)

Figure 2:
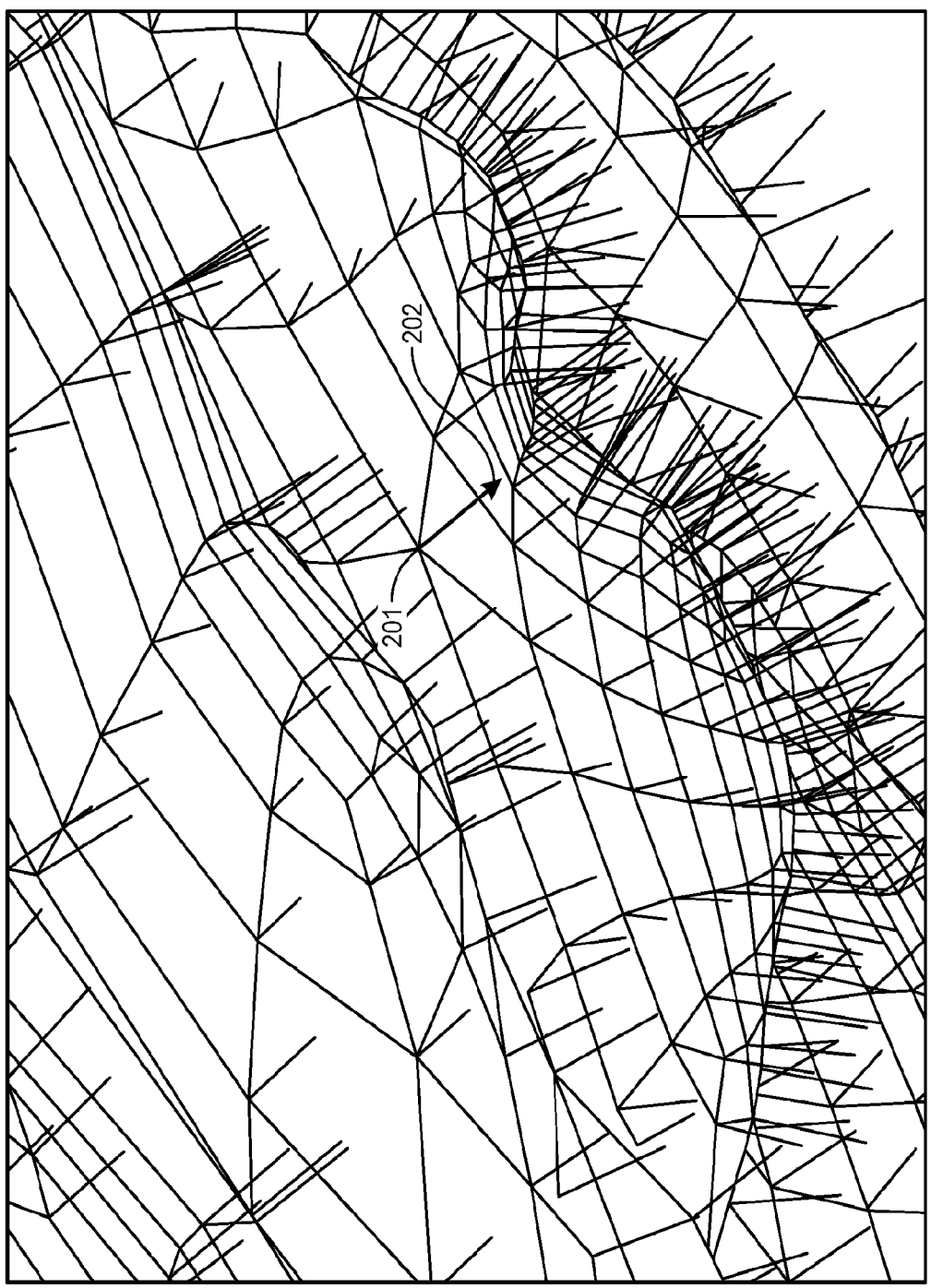
FIG. 2 is a graphic of a portion of a 3D mesh corresponding to cardiac segment 11.

FIG. 2 is a graphic of a portion of a 3D mesh corresponding to cardiac segment 11. The intersections of the lines represent vertices, and the areas bounded by lines are the faces. The initial source location is illustrated as being at vertex 201 corresponding to the source location. The arrow 202 represents the normal vector.

Figure 3A:
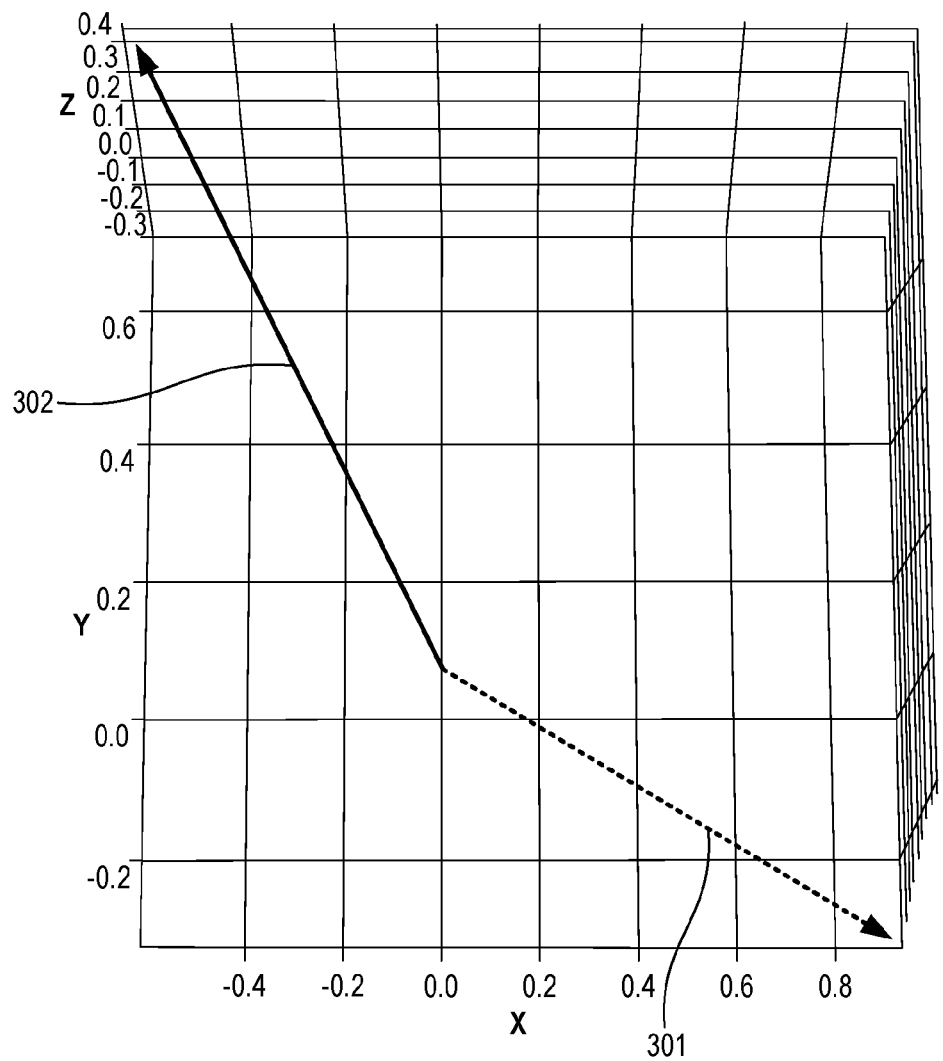
FIGS. 3A-3C are graphs that illustrate different views of the normal vector and the activation vector corresponding to an epicardial source.
Figure 3B:
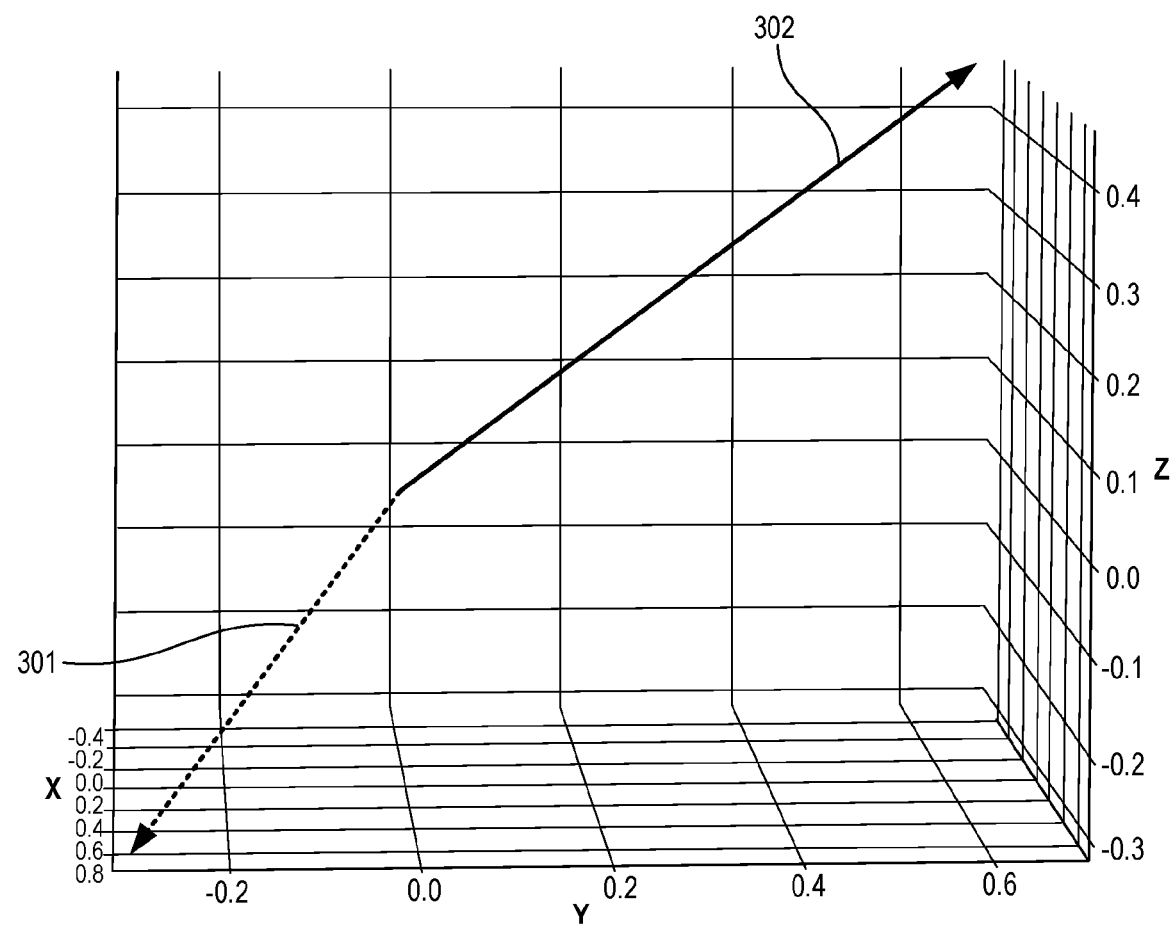
Figure 3C:
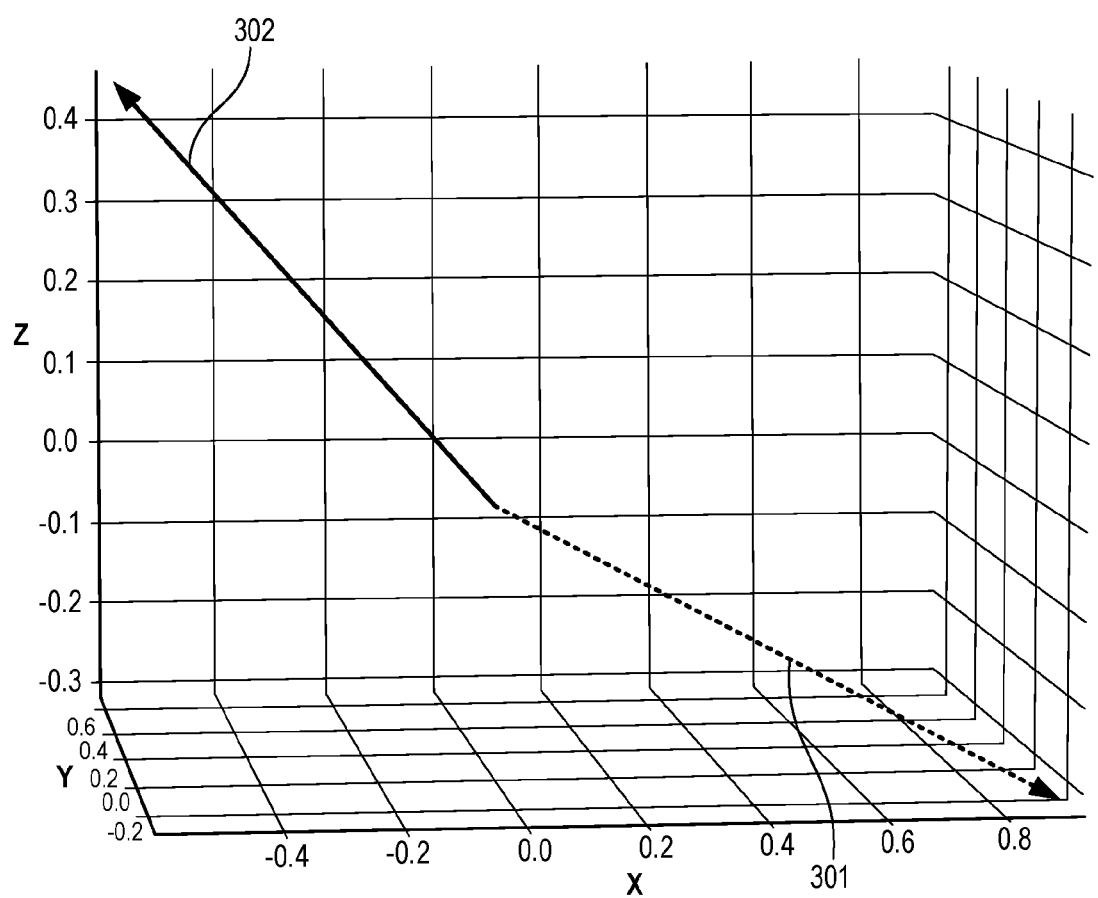

FIGS. 3A-3C are graphs that illustrate different views of the normal vector and the activation vector corresponding to an epicardial source. Arrow 301 represents the normal vector, and arrow 302 represents the activation vector. The vectors have been normalized to length of 1.0 and translated to have their origin points at (0, 0, 0). The depth angle is about 150 degrees, indicating an epicardial source. FIG. 3A is an anteroposterior view. FIG. 3B is a left lateral view. FIG. 3C is an inferior view. Although not illustrated, the SLR system displays a graphic of the patient's heart generated based on the 3D mesh illustrating the source location on the epicardium.

Figure 4A:
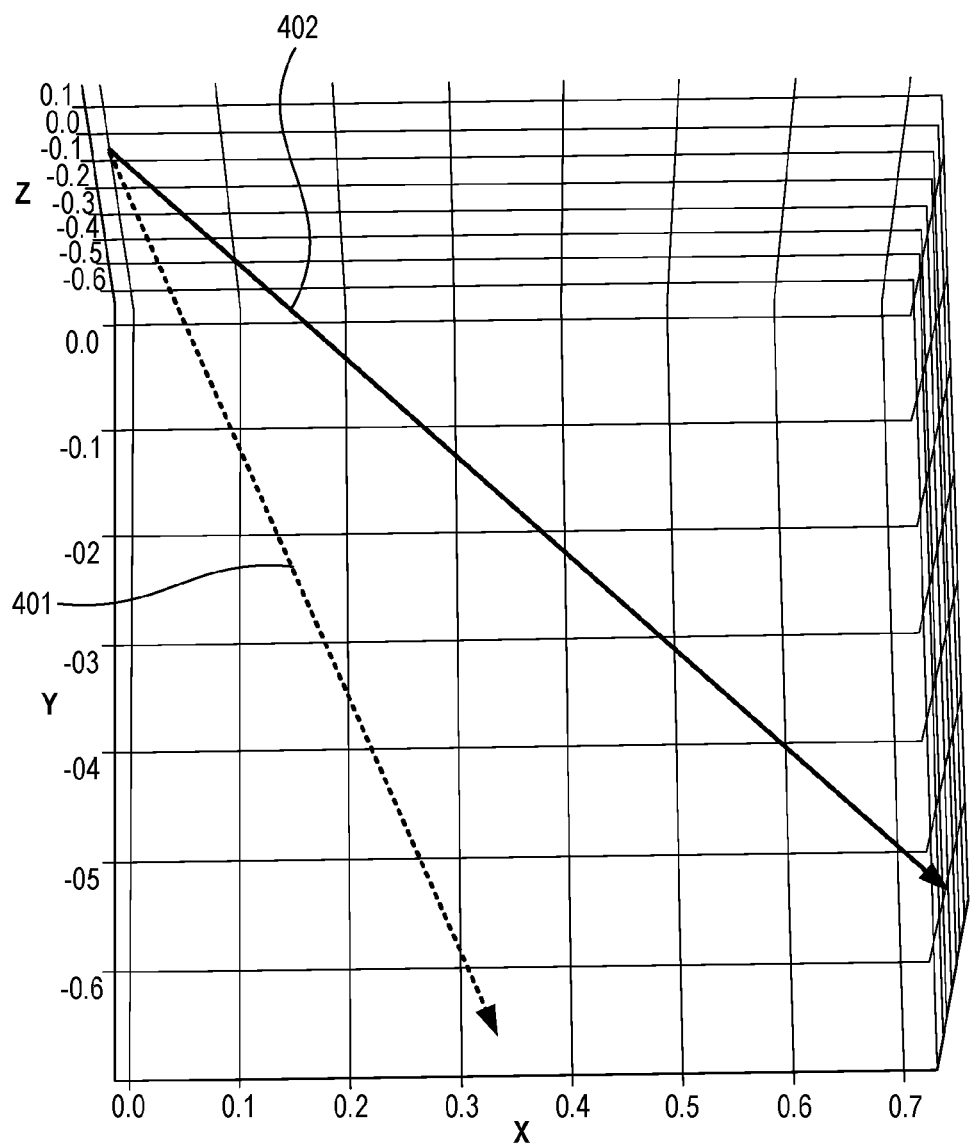
FIGS. 4A-4C are graphs that illustrate different views of the normal vector and the activation vector corresponding to an endocardial source.
Figure 4B:
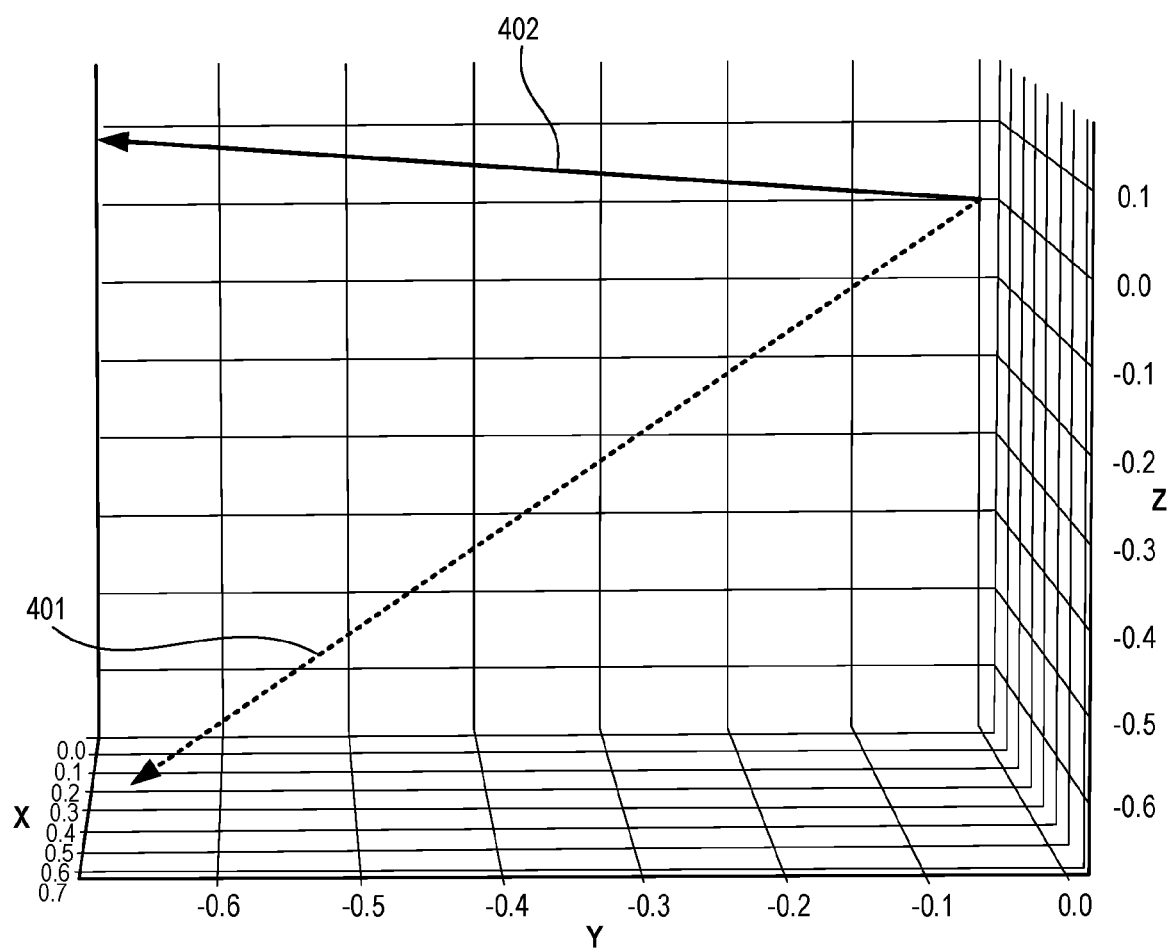
Figure 4C:
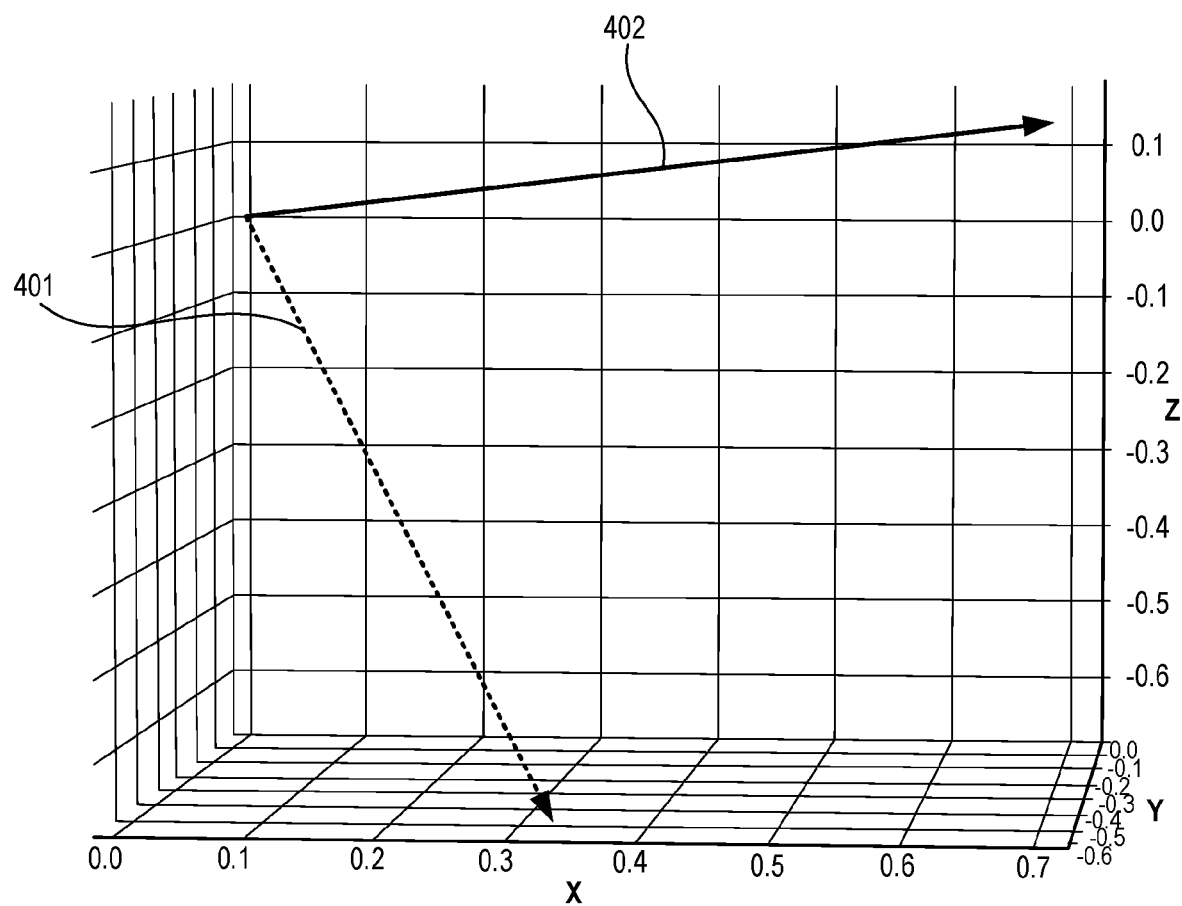

FIGS. 4A-4C are graphs that illustrate different views of the normal vector and the activation vector corresponding to an endocardial source. Arrow 401 represents the normal vector, and arrow 402 represents the activation vector. The vectors have been normalized to length of 1.0 and translated to have their origins at (0, 0, 0). The depth angle is approximately 45 degrees, indicating an endocardial source. FIG. 4A is an anteroposterior view. FIG. 4B is a left lateral view. FIG. 4C is an inferior view.

Figure 5A:
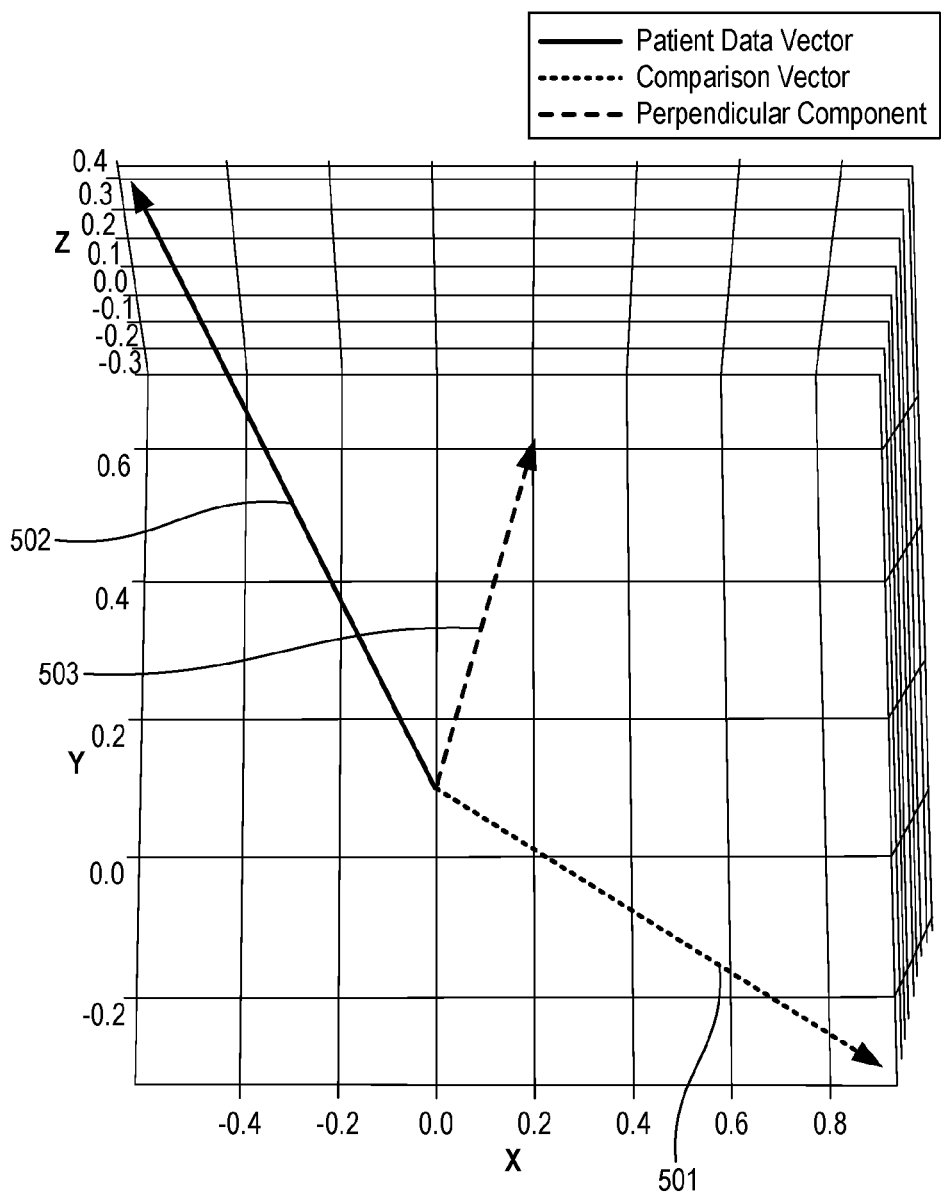
FIGS. 5A-5C are graphs that illustrate different view of a normal vector and an activation vector based on activation in the midline myocardium.
Figure 5B:
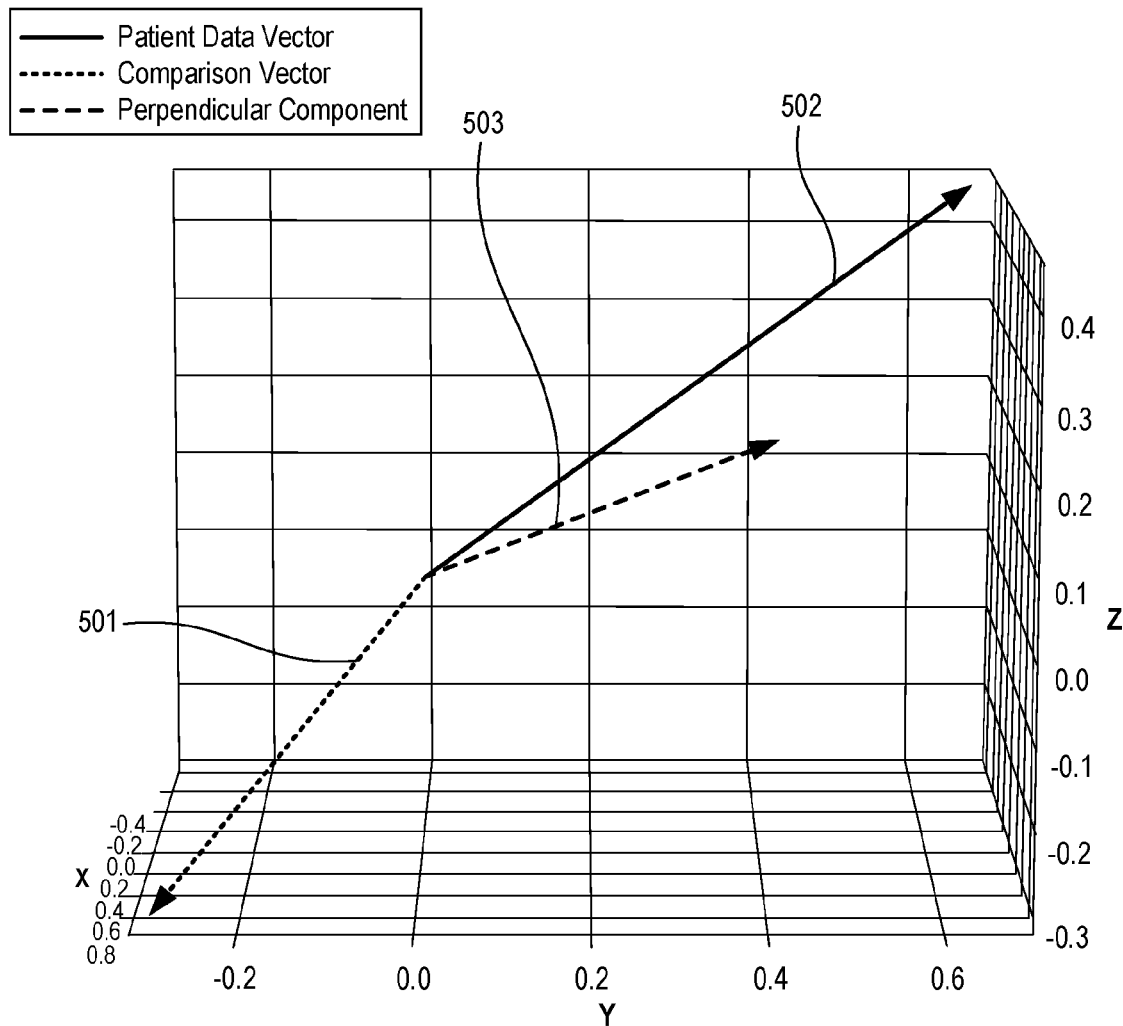
Figure 5C:
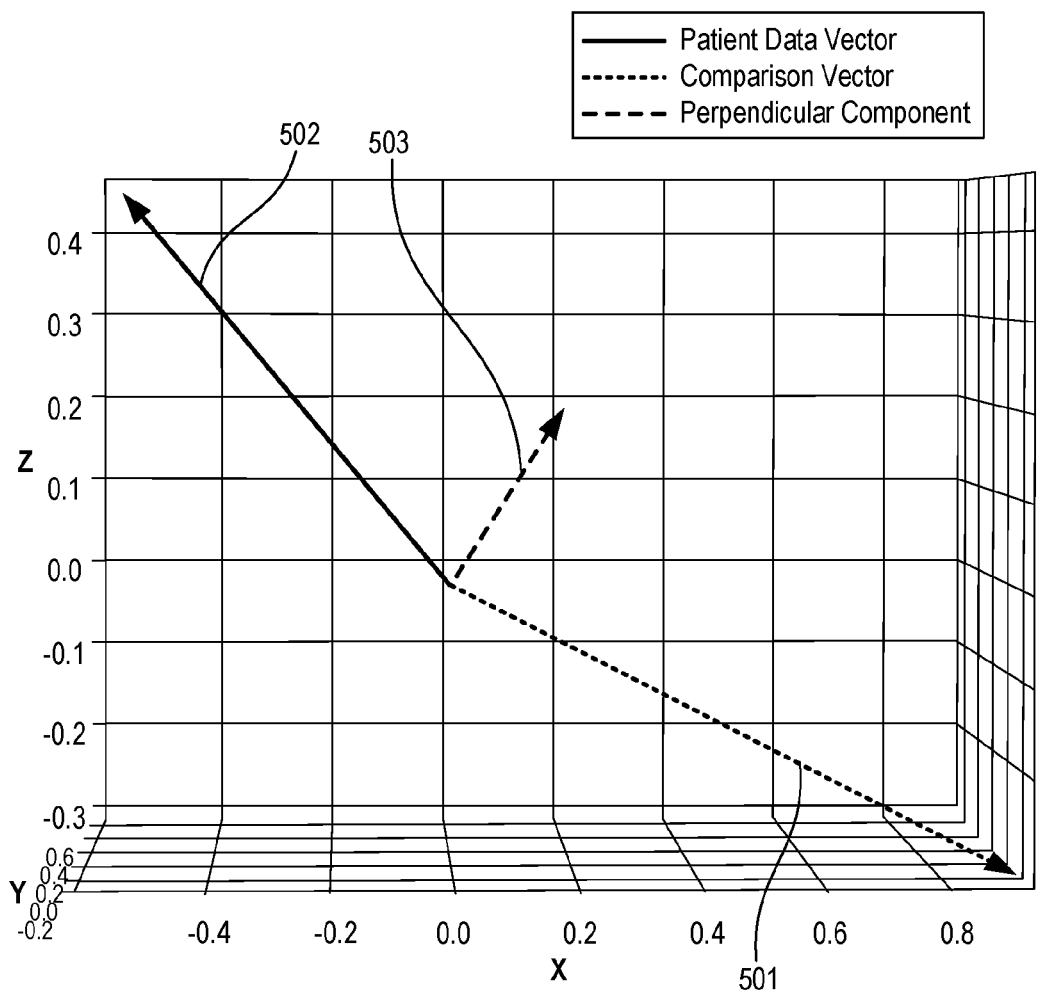

FIGS. 5A-5C are graphs that illustrate different views of a normal vector and an activation vector based on activation in the midline myocardium. Arrow 501 represents the normal vector, arrow 502 represents the activation vector, and arrow 503 is perpendicular to the plane of the normal vector and represents the component of the activation vector within the myocardium. This arrow represents activation away from the protected isthmus of the arrhythmia (in one example, at reentrant ventricular tachycardia). In this example, arrow 503 is oriented to the patient's right, superior, and anterior, indicating that the protected isthmus of the ventricular tachycardia is to the left, inferior, and posterior to the location identified by the forward-solution mapping process as being the arrhythmia origin of the ventricular tachycardia. FIG. 5A is an anteroposterior view. FIG. 5B is a left lateral view. FIG. 5C is an inferior view.

Figure 6:
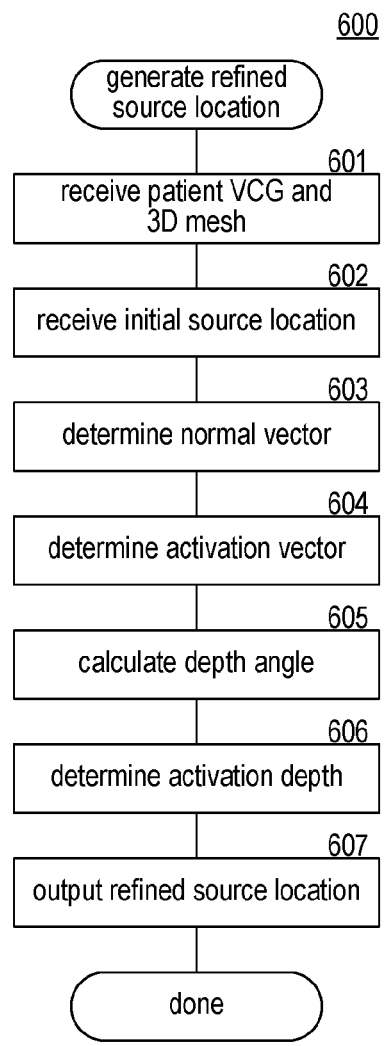
FIG. 6 is a flow diagram that illustrates processing of a generate refined source location component of a source location refinement system in some embodiments.

FIG. 6 is a flow diagram that illustrates processing of a generate refined source location component of the SLR system in some embodiments. The generate refine source location component 600 inputs an initial source location, the patient VCG, and a 3D mesh representing the cardiac geometry of the patient. The component outputs a refined source location generated based on the inputs. In block 601, the component receives the patient VCG and the 3D mesh. In block 602, the component receives the initial source location. In block 603, the component determines the normal vector based on the initial source location and the 3D mesh. In block 604, the component determines the activation vector based on the normal vector and the patient VCG. In block 605, the component calculates the depth angle based on the normal vector and the activation vector. In block 606, the component determines an activation depth based on the depth angle. In block 607, the component outputs an indication of the refined source location that is along a line from the initial source location to a near location on the opposite side of the heart at the determined activation depth and completes.

Figure 7:
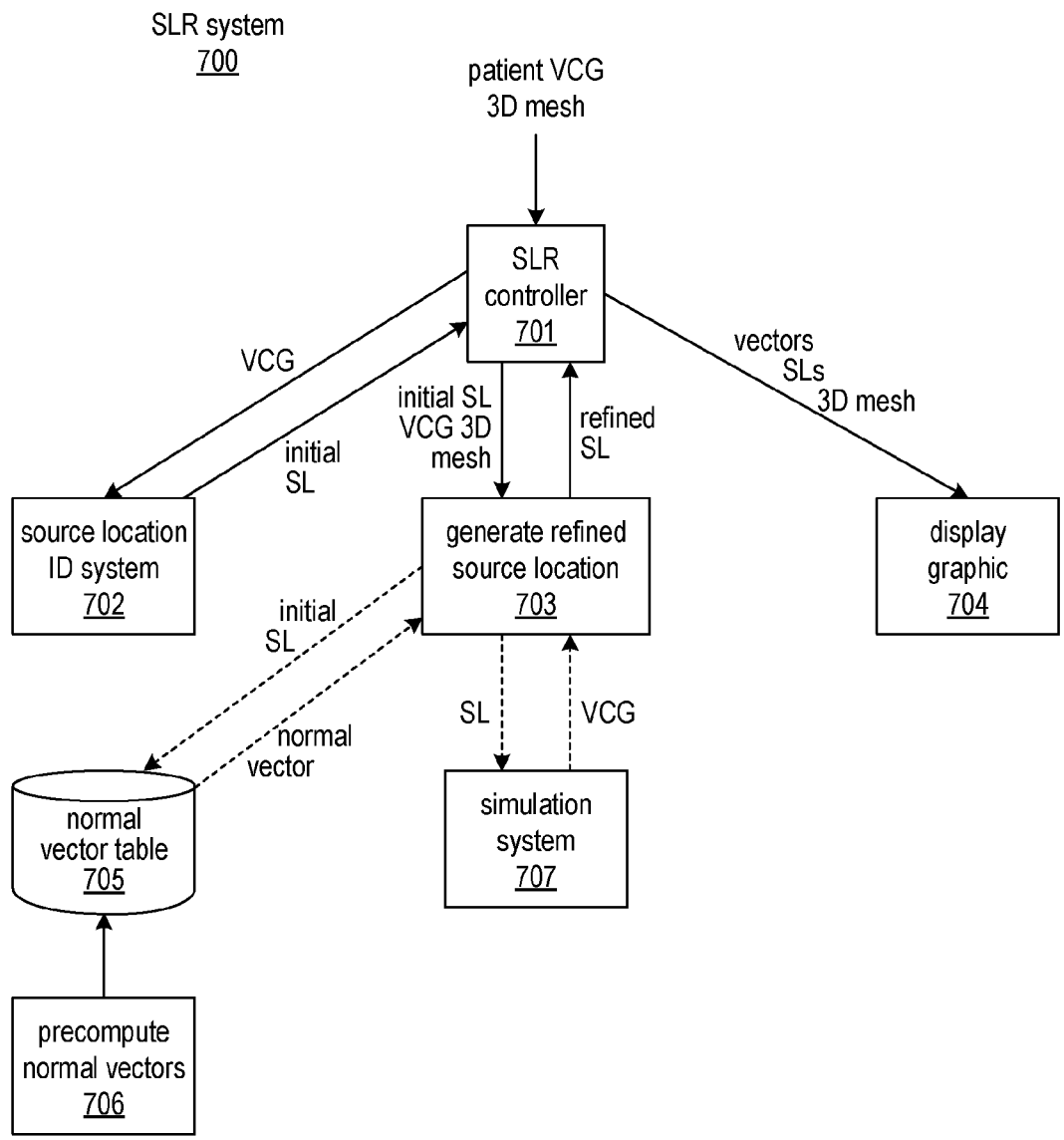
FIG. 7 is a block diagram illustrating an architecture of a source location refinement system in some embodiments.

FIG. 7 is a block diagram that illustrates an architecture of the SLR system in some embodiments. The SLR system includes an SLR controller 701, a generate refined source location component 703, a display graphic component 704, a normal vector table 705, and a precompute normal vectors component 706. The SLR system interface with a source location identification system 702, a simulation system 707, and various systems (not shown) such as ECG collection or storage devices, EHR systems, ablation planning systems, ablation control systems, and so on. The SLR controller receives a patient VCG and a 3D mesh. The SLR controller passes the patient VCG to the source location identification system. The source location identification system returns the initial source location. The SR controller then provides the initial source location, the patient VCG, and the 3D mesh to the generate refined source location component. The generate refined source location component returns the refined source location. The SLR controller passes an indication of the normal and activation vectors, the initial and refined source locations, and the 3D mesh to the display graphics component that displays a graphic indicating the refined source location. The generate refined source location component may access the normal vector table to identify the normal vector. The normal vector table may be generated by the precompute normal vectors component. The generate refined source location component may also invoke the simulation system passing an indication of a source location. The simulation system runs a simulation based on a source location and provides a VCG derived from the simulation. The simulation system is employed when processing source locations and areas of the heart that have irregular geometries.

An ML model employed by the SLR system may be any of a variety or combination of supervised, semi-supervised, self-supervised, unsupervised, or reinforcement learning ML architectures including a neural network (e.g., a fully connected, convolutional, recurrent, or autoencoder neural network), K-means clustering, K Nearest Neighbors (KNN), and so on. When the ML model is a deep neural network, the model is trained using training data that includes features derived from data and labels corresponding to the data. For example, the data may be images of QRS complexes with a feature being the image itself, and the labels may be normal vector, activation vector, or myocardial source location. The training results in a set of weights for the activation functions of the layers of the deep neural network. The trained deep neural network can then be applied to new data to generate a label for that new data. An ML model may generate values of discrete domain (e.g., classification), probabilities, and/or values of a continuous domain (e.g., regression value, classification probability).

A neural network model has three major components: architecture, loss function, and search algorithm. The architecture defines the functional form relating the inputs to the outputs (in terms of network topology, unit connectivity, and activation functions). The search for a set of weights that minimizes the loss function is the training process. A neural network model may use a radial basis function (RBF) network and a standard or stochastic gradient descent as the search technique with backpropagation.

A convolutional neural network (CNN) has multiple layers such as a convolutional layer, a rectified linear unit (ReLU) layer, a pooling layer, a fully connected (FC) layer, and so on. Some more complex CNNs may have multiple convolutional layers, pooling layers, and FC layers. Each layer includes a neuron for each output of that layer. A neuron inputs outputs of prior layers (or original input) and applies an activation function to the inputs to generate an output.

A convolutional layer may include multiple filters (also referred to as kernels or activation functions). A filter inputs a convolutional window, for example, of a CT image, applies weights to each pixel of the convolutional window, and outputs value for that convolutional window. For example, if a slice of a CT image is 256 by 256 pixels, the convolutional window may be 8 by 8 pixels. The filter may apply a different weight to each of the 64 pixels in a convolutional window to generate the value. The convolutional layer may include, for each filter, a node (also referred to as a neuron) for each pixel of the CT image assuming a stride of one with appropriate padding. Each node outputs a feature value based on a set of weights for the filter that are learned during the training of the CNN.

An activation function has a weight for each input and generates an output by combining the inputs based on the weights. The activation function may be an ReLU that sums the values of each input times its weight to generate a weighted value and outputs max (0, weighted value) to ensure that the output is not negative. The weights of the activation functions are learned when training an ML model. The ReLU function of max (0, weighted value) may be represented as a separate ReLU layer with a neuron for each output of the prior layer that inputs that output and applies the ReLU function to generate a corresponding "rectified output."

A pooling layer may be used to reduce the size of the outputs of the prior layer by downsampling the outputs. For example, each neuron of a pooling layer may input 16 outputs of the prior layer and generate one output resulting in a 16-to-1 reduction in outputs.

An FC layer includes neurons that each input all the outputs of the prior layer and generate a weighted combination of those inputs. For example, if the penultimate layer generates 256 outputs and the FC layer inputs a neuron for each of 8 bits used to represent a percentage of myocardial depth, each neuron inputs the 256 outputs and applies weights to generate value for the bit the neuron represents.

The SLR system may train various ML models using clinical data or simulated data as training data. That training data may not be sufficient to effectively train the ML model. To overcome this lack of training data, the SLR system may employ a generative adversarial network (GAN) or an attribute (attGAN). (See, Goodfellow, I., Pouget-Abadie, J., Mirza, M., Xu, B., Warde-Farley, D., Ozair, S., Courville, A. and Bengio, Y., 2020. Generative adversarial networks. Communications of the ACM, 63(11), pp. 139-144 and see He, Z., Zuo, W., Kan, M., Shan, S. and Chen, X., 2019. Attgan: Facial attribute editing by only changing what you want. IEEE transactions on image processing, 28(11), pp. 5464-5478, which are hereby incorporated by reference.) A GAN employs a generator and discriminator and is trained using training data such as CT images of a heart. The generator generates generated images based on random input (referred to as noise). The generator is trained to generate generated CT images that cannot be distinguished from real CT images. The discriminator indicates whether an input image is real or generated. The generator and discriminator are trained in parallel to learn their weights. The generator is trained to generate increasingly more realistic CT images, and the discriminator is trained to more effectively discriminate between real CT images and generate CT images. The SLR system may employ the generator to generate CT images for use in training.

An attGAN also includes a generator and discriminator like a GAN but also includes an attGAN classifier. The training data includes images (e.g., CT images or images of QRS complexes) and attributes of the images (e.g., myocardial source location). The generator includes a generator encoder and a generator decoder. The generator encoder inputs a real image and is trained to generate a latent vector of latent variables representing the real image. The generator decoder inputs the latent vector for a real image and its attribute values (e.g., myocardial source location). The attGAN classifier inputs an image and generates a prediction of its attribute values. The attGAN is trained to generate a generated image that represents the input real image modified based on attribute values. The generator encoder and the generator decoder form the generator model.

In some embodiments, the AFL classification system may employ a diffusion ML model to generate additional training data using a generative process. (See, Rombach, R., Blattmann, A., Lorenz, D., Esser, P. and Ommer, B., 2022. High-resolution image synthesis with latent diffusion models. In *Proceedings of the IEEE/CVF conference on computer vision and pattern recognition* (pp. 10684-10695), which is hereby incorporated by reference.) A diffusion ML model is a generative ML model that inputs noisy data and progressively denoises the data until the denoised data appears to be indistinguishable from real data such as a CT image or an image of an ECG. A diffusion ML model is trained using a forward diffusion process that successively adds noise to input training data to generate noisy data and a reverse diffusion process that successively denoises the noisy data to generate denoised data that approximates the input training data. The training learns weights for the reverse diffusion process that tend to minimize the difference between the input training data and the denoised data. After a diffusion model is trained, the reverse diffusion process is employed to generate data that can be used to train the AFL ML model. To do so, randomly generated noisy data is input to the reverse diffusion process which denoises the noisy data to generate denoised data that appears to real data.

The forward diffusion process employs a Markov chain that incrementally adds Gaussian noise to the training data over a series of steps. This process transforms the training data from its initial distribution to a Gaussian distribution. The reverse diffusion process employs a neural network to incrementally approximate and remove the noise that was added at each step of the forward diffusion process. When generating data, randomly generated noisy data is input to the reverse diffusion process which incrementally removes the noise that was learned during training.

The forward diffusion process systematically adds Gaussian noise to the original data $x_0$ Gaussian noise over T timesteps, resulting in a sequence of increasingly noisy data $x_1, x_2, \ldots, x_T$. The process at each time step t may be represented by the equation:

$$x_t = \sqrt{\alpha_t} x_{t-1} + \sqrt{1-\alpha_t}\, \varepsilon_t,\; \varepsilon_t \sim \mathcal{N}(0, I)$$

where $x_t$ is data at timestep t, $\varepsilon_t$ is Gaussian noise, $\alpha_t$ is the amount of noise added, and I is the identity matrix.

The reverse diffusion process learns the distribution of the training data by starting from noise and progressively denoising it over the timesteps. The training estimates the reverse of the forward diffusion process using a neural network that may be represented by the equation:

$$x_{t-1} = \frac{1}{\sqrt{\alpha_t}}\left(x_t - \frac{1-\alpha_t}{\sqrt{1-\overline{\alpha}_t}} f_\theta(x_t, t)\right)$$

where $$\overline{\alpha}_t = \prod_{i=1}^{t} \alpha_i$$

represent the cumulative noise and $f_\theta(x_t,t)$ represents the neural network.

The goal of training a diffusion model is to minimize the difference between the original data and the data reconstructed by the reverse diffusion process using a loss function that may be represented by the equation.

$$L(\theta) = \mathbb{E}_{x_0, \varepsilon_t, t}\left[\|\varepsilon_t - f_\theta(x_t, t)\|^2\right].$$

A diffusion model may also include a conditioning mechanism that allows for factoring in domain-specific information into the reverse diffusion process. The domain-specific information may be employed by a cross-attention mechanism of the neural network (e.g., U-Net architecture) of the reverse diffusion process. The AFL classification system may train the reverse diffusion process with domain-specific information that includes the AFL type and/or the AFL source location. To generate ECG images, the AFL classification system inputs a noisy image and an AFL type into the reverse diffusion process which generates an ECG image corresponding to that AFL type.

Multimodal ML combines different modalities of input data to generate an output. The modalities may be, for example, CT images, voltage-time series of QRS complexes, and normal or activation vectors.

In one multimodal ML approach, referred to as "early fusion," data of the different modalities is combined at the input stage and is then trained on the multimodal data. The training data for these modalities include a collection of sets of a CT image and a QRS complex (or portion of a QRS complex) and a myocardial source location as a label. The CT images and voltage-time series may be used in their original form or preprocessed, for example, to reduce its dimensionality by compressing the data into byte arrays or applying a principal component analysis. Also, the resolutions of the CT image may be reduced. A byte array may be processed by a cross-attention mechanism to condense the bytes into a vector of a fixed size. The vectors are then used to train an ML model primarily using supervised approaches although self-supervised or unsupervised approaches may also be used.

In a second multimodal machine learning approach, data from different modalities may be kept separate at the input stage and used as inputs to different, modality-specific ML models (e.g., a CNN for a CT image and a recurrent neural network (RNN) for a voltage-time series representing an ECG). The modality-specific ML models may be trained jointly such that information from across different modalities is combined to make predictions, and the combined (cross-modality) loss is used to adjust model weights. Alternatively, the modality-specific ML models may also be trained separately using a separate loss function for each modality. A combined ML model is then trained based on the outputs of the modality specific models. Continuing with the example, the training data for each modality-specific ML model may be based on its data along with a label. The combined ML model is then trained with the outputs of the modality-specific ML models with a final label.

Transformer machine learning was introduced as an alternative to an RNN network that is both more effective and more parallelizable. (See, Vaswani, A., Shazeer, N., Parmar, N., Uszkoreit, J., Jones, L., Gomez, A. N., Kaiser, Ł. and Polosukhin, I., 2017. Attention is all you need. Advances in neural information processing systems, 30, which is hereby incorporated by reference.) Transformer machine learning was originally described in the context of natural language processing (NLP) but has been adapted to other applications such as image processing to augment or replace a CNN. In the following, transformer machine learning is described in the context of NLP as introduced by Vaswani.

A transformer includes an encoder whose output is input to a decoder. The encoder includes an input embedding layer followed by one or more encoder attention layers. The input embedding layer generates an embedding of the inputs. For example, if a transformer ML model is used to process a sentence as described by Vaswani, each word may be represented as a token that includes an embedding of a word and its positional information. Such an embedding is a vector representation of a word such that words with similar meanings are closer in the vector space. The positional information is based on the position of the word in the sentence.

The first encoder attention layer inputs the embeddings and the other encoder attention layers input the output from the prior encoder attention layer. An encoder attention layer includes a multi-head attention mechanism followed by a normalization sublayer whose output is input to a feedforward neural network followed by a normalization sublayer. A multi-head attention mechanism includes multiple self-attention mechanisms that each inputs the encodings of the previous layer and weighs the relevance encodings to other encodings. For example, the relevance may be determined by the following attention function:

$$\text{Attention}(Q, K, V) = \text{softmax}\left(\frac{QK^T}{\sqrt{d_k}}\right)V$$

where Q represents a query, K represents a key, V represents a value, and $d_k$ represents the dimensionality of K. This attention function is referred to as scaled dot-product attention. In Vaswani, the query, key, and value of an encoder multi-head attention mechanism is set to the input of the encoder attention layer. The multi-head attention mechanism determines the multi-head attention as represented by the following:

$$\text{MultiHead}(Q, K, V) = \text{concat}(\text{head}_1, \ldots, \text{head}_8)W^O$$

$$\text{head}_i = \text{Attention}(QW_i^Q, KW_i^K, VW_i^V)$$

where W represents weights that are learned during training. The weights for the feedforward networks are also learned during training. The weights may be initialized to random values. A normalization layer normalizes its input to a vector having a dimension as expected by the next layer or sublayer.

The decoder includes an output embedding layer, decoder attention layers, a linear layer, and a softmax layer. The output embedding layer inputs the output of the decoder shifted right. Each decoder attention layer inputs the output of the prior decoder attention layer (or the output embedding layer) and the output of the encoder. The embedding layer is input to the decoder attention layer, the output of the decoder attention layer is input the linear layer, and the output of the linear layer is input to the softmax layer which outputs probabilities. A decoder attention layer includes a decoder masked multi-head attention mechanism followed by a normalization sublayer, a decoder multi-head attention mechanism followed by a normalization sublayer, and a feedforward neural network followed by a normalization sublayer. The decoder masked multi-head attention mechanism masks the input so that predictions for a position are only based on outputs for prior positions. A decoder multi-head attention mechanism inputs the normalized output of the decoder masked multi-head attention mechanism as a query and the output of the encoder as a key and a value. The feedforward neural network inputs the normalized output of the decoder multi-head attention mechanism. The normalized output of the feedforward neural network is the output of that multi-head attention layer. The weights of the linear layer are also learned during training.

After being trained, a sentence may be input to encoder to generate an encoding of the sentence that is input to the decoder. Initially, the output of the decoder that is input to the decoder is set to null. The decoder then generates an output based on the encoding and the null input. The output of the decoder is appended to the decoder's current input, and the decoder generates a new output. This decoding process is repeated until the encoder generates a termination symbol.

Although initially developed to process sentences, transformers have been adapted for image recognition. The input of a decoder of a transformer may be a representation of fixed-size patches of the CT image or an image of a QRS complex. (See, Dosovitskiy, A., Beyer, L., Kolesnikov, A., Weissenborn, D., Zhai, X., Unterthiner, T., Dehghani, M., Minderer, M., Heigold, G., Gelly, S. and Uszkoreit, J., 2020. An image is worth 16×16 words: Transformers for image recognition at scale. *arXiv preprint arXiv:*2010.11929, which is hereby incorporated by reference.) The representation of a patch may be, for each pixel of the patch, an encoding of its row, column, and color. The output of the encoder that encodes a CT image may be fed into neural network that may also input a representation of a QRS complex. The neural network outputs a myocardial depth.

The SLR system may also employ a state space model (SSM) to generate a latent representation of a QRS complex. An example of an SSM is S4 as described in Gu, A. and Dao, T., 2023. Mamba: Linear-time sequence modeling with selective state spaces. *arXiv preprint arXiv:*2312.00752 (Mamba), which is hereby incorporated by reference. Mamba provides a unique selection mechanism that adapts structured SSM parameters based on the input to selectively focus on relevant information within sequences, effectively filtering out less pertinent information. Mamba integrates SSM with multi-layer perceptron (MLP) blocks to support sequence modeling for sequential data such as ECG complexes.

The various ML models of the SLR system may input features representing a CT image or a QRS complex. The features may include an image, a voltage-time series, a QRS integral, Q-R interval, and so on. The features used by an ML model may be manually or automatically selected and may vary based on the available training data. The features that may be useful in providing an accurate output for an ML model are referred to as informative features. An assessment of which features are informative may be based on various features selection techniques such as a predictive power score, a lasso regression, a mutual information analysis, and so on.

The features may also be latent vectors generated using an ML model such as an autoencoder. For example, an autoencoder may be trained using a voltage-time series or a CT image. In the case of a voltage-time series, when a voltage-time series is input into the trained autoencoder, the latent vector that is generated is a feature vector that represents the voltage time series. That feature vector can be input into another trained ML model such as a neural network to generate an output. When training the other ML model, for example, to generate an activation vector, the training voltage-time series are input to the autoencoder to generate training feature vectors that are labeled with an activation vector. The other ML model is then trained using the labeled feature vectors. The autoencoder may be trained using the training voltage-time series or may have been previously trained using a collection of voltage-time series. Rather than pre-training an autoencoder, only the encoder of the autoencoder that generates the latent vector (and not the decoder) may be trained in parallel with the other ML model using a combined loss function. In such a case, no autoencoding is performed. Rather the latent vector represents features of a voltage-time series that are particularly relevant to generating the output of the other ML model. Such an ML architecture may be used, for example, when the other ML model (e.g., transformer) is not designed to process a CT image directly.

The following paragraphs describe various aspects of the SLR system. An implementation of the SLR system may employ any combination or sub-combination of the aspects and may employ additional aspects. The processing of the aspects may be performed by one or more computing systems with one or more processors that execute computer-executable instructions that implement the aspects and that are stored on one or more computer-readable storage mediums.

The computing systems (e.g., network nodes or collections of network nodes) on which the SLR system and the other described systems may be implemented may include a central processing unit, input devices, output devices (e.g., display devices and speakers), storage devices (e.g., memory and disk drives), network interfaces, graphics processing units, communications links (e.g., Ethernet, Wi-Fi, cellular, and Bluetooth), global positioning system devices, and so on. The input devices may include keyboards, pointing devices, touch screens, gesture recognition devices (e.g., for air gestures), head and eye tracking devices, microphones for voice recognition, and so on. The computing systems may include high-performance computing systems, distributed systems, cloud-based computing systems, client computing systems that interact with cloud-based computing system, desktop computers, laptops, tablets, e-readers, personal digital assistants, smartphones, gaming devices, servers, and so on. The computing systems may access computer-readable media that include computer-readable storage mediums and data transmission mediums. The computer-readable storage mediums are tangible storage means that do not include a transitory, propagating signal. Examples of computer-readable storage mediums include memory such as primary memory, cache memory, and secondary memory (e.g., DVD), and other storage. The computer-readable storage media may have recorded on them or may be encoded with computer-executable instructions or logic that implements the SLR system and the other described systems. The data transmission media are used for transmitting data via transitory, propagating signals or carrier waves (e.g., electromagnetism) via a wired or wireless connection. The computing systems may include a secure crypto processor as part of a central processing unit (e.g., Intel Secure Guard Extension (SGX)) for generating and securely storing keys and for encrypting and decrypting data using the keys and for securely executing all or some of the computer-executable instructions of the SLR system. Some of the data sent by and received by the SLR system may be encrypted, for example, to preserve patient privacy (e.g., to comply with government regulations such the European General Data Protection Regulation (GDPR) or the Health Insurance Portability and Accountability Act (HIPAA) of the United States). The SLR system may employ asymmetric encryption (e.g., using private and public keys of the Rivest-Shamir-Adleman (RSA) standard) or symmetric encryption (e.g., using a symmetric key of the Advanced Encryption Standard (AES)).

The one or more computing systems may include client-side computing systems and cloud-based computing systems (e.g., public or private) that each executes computer-executable instructions of the SLR system. A client-side computing system may send data to and receive data from one or more servers of the cloud-based computing systems of one or more cloud data centers. For example, a client-side computing system may send a request to a cloud-based computing system to perform tasks such as run a patient-specific simulation of electrical activity of a heart or train a patient-specific ML model. A cloud-based computing system may respond to the request by sending to the client-side computing system data derived from performing the task such as a source location of an arrhythmia. The servers may perform computationally expensive tasks in advance of processing by a client-side computing system such as training an ML model or in response to data received from a client-side computing system. A client-side computing system may provide a user experience (e.g., user interface) to a user of the SLR system. The user experience may originate from a client computing device or a server computing device. For example, a client computing device may generate a patient-specific graphic of a heart and display the graphic. Alternatively, a cloud-based computing system may generate the graphic (e.g., in a Hyper-Text Markup Language (HTML) format or an eXtensible Markup Language (XML) format) and provide it to the client-side computing system for display. A client-side computing system may also send data to and receive data from various medical devices such as an ECG monitor, an ablation therapy device, an ablation planning device, and so on. The data received from the medical devices may include an ECG, actual ablation characteristics (e.g., ablation location and ablation pattern), and so on. The data sent to a medical device may include data, for example, data in a Digital Imaging and Communications in Medicine (DICOM) format. A client-side computing device may also send data to and receive data from medical computing systems that store patient medical history data, descriptions of medical devices (e.g., type, manufacturer, and model number) of a medical facility, that store, medical facility device descriptions, that store results of procedures, and so on. The term cloud-based computing system may encompass computing systems of a public cloud data center provided by a cloud provider (e.g., Azure provided by Microsoft Corporation) or computing systems of a private server farm (e.g., operated by the provider of the SLR system).

The SLR system and the other described systems may be described in the general context of computer-executable instructions, such as program modules and components, executed by one or more computers, processors, or other devices. Generally, program modules or components include routines, programs, objects, data structures, and so on that perform tasks or implement data types of the SLR system and the other described systems. Typically, the functionality of the program modules may be combined or distributed as desired in various examples. Aspects of the SLR system and the other described systems may be implemented in hardware using, for example, an application-specific integrated circuit (ASIC) or a field programmable gate array (FPGA).

All documents incorporated by reference are incorporated in their entirety for the full extent of their disclosures. In the event of inconsistencies between the language in this document and any incorporated-by-reference document, the language in the incorporated-by-reference document should be considered supplementary to that of this document and the language in this document controls.

The following paragraphs describe various aspects of the SLR system. An implementation of the SLR system may employ any combination or sub-combination of the aspects and may employ additional aspects. The processing of the aspects may be performed by one or more computing systems with one or more processors that execute computer-executable instructions that implement the aspects and that are stored on one or more computer-readable storage mediums.

SUMMARY OF CLAIMS TO BE ADDED

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims.

We claim:

1. A method for treating an arrhythmia of a patient, the method comprising:
    performing, by one or more computing systems, a refining of an initial source location of a source of the arrhythmia within a heart wall of the heart of the patient by:
        accessing an indication of an initial source location of the arrhythmia, the initial source location being within a first layer of the heart wall of the heart, the heart wall having a first layer, a myocardium, and a second layer;
        generating a normal vector that is normal to the first layer at the initial source location;
        determining an activation vector indicating the direction of electrical force of the heart during an initial stage of depolarization;
        determining a depth angle between the normal vector and the activation vector; and
        calculating a depth within the heart wall indicating the depth of the source within the heart wall, the calculation of the depth based on the depth angle; and
    performing a pulsed field ablation or a radiofrequency ablation on the patient based on the source location and depth of the arrhythmia.

2. The method of claim 1 wherein the first layer is the endocardium and the second layer is the epicardium.

3. The method of claim 1 wherein the first layer is the epicardium and the second layer is the endocardium.

4. The method of claim 1 wherein the activation vector is derived from an initial portion of a QRS complex of an electrocardiogram.

5. The method of claim 1 wherein the generation of the normal vector is based on a three-dimensional (3D) mesh representing the geometry of the heart, the 3D mesh having vertices representing locations within the heart wall, the normal vector being normal to a face of the 3D mesh that includes a vertex representing a location proximate to the source location.

6. The method of claim 1 wherein the generation of the normal vector is based on a segmentation of an image of the heart.

7. The method of claim 1 further comprising determining the initial source location via a cardiac mapping procedure.

8. The method of claim 1 further comprising determining the initial source location based on similarity of a cardiogram derived from the heart to a mapping cardiogram of a collection of mapping cardiograms that are mapped to mapping source locations.

9. The method of claim 8 wherein the mapping cardiograms are generated based on simulations of electrical activity of simulated hearts having a simulated heart configuration that includes a simulated source location of a simulated source of a simulated arrhythmia.

10. The method of claim 1 further comprising displaying a representation of the normal vector and the activation vector.

11. The method of claim 10 wherein the normal vector and the activation vector each have an origin point and the representation is based on vector translation resulting in the normal vector and the activation vector having the same origin point.

12. The method of claim 11 further comprising displaying a portion of a circle with a diameter oriented in the direction of the normal vector with a graphic illustrating a quantization criterion.

13. The method of claim 12 wherein the graphic is based on variations in coloring of the portion of the circle.

14. The method of claim 1 further comprising displaying a numerical value of the depth angle.

15. The method of claim 1 wherein the source of the arrhythmia is a reentrant circuit having an isthmus and an exit site and wherein the location of the isthmus is the source location and further comprising identifying the direction of the isthmus relative to the exit site based on the direction of the activation vector.

16. The method of claim 1 further comprising determining a refined source location based on the initial source location and the depth.

17. The method of claim 16 wherein the refined source location is a depth distance along a line from the initial source location to a point on the second layer that satisfies a nearness criterion.

18. The method of claim 16 further comprising providing the refined source location to an ablation system so that an ablation is performed factoring in the refined source location.

19. A method for treating an arrhythmia of a patient, the method comprising:
under control of one or more computing systems fer,
refining a source location of the arrhythmia, the one or more computing systems comprising:
one or more computer-readable storage mediums that store computer-executable instructions for controlling the one or more computing systems to:
receive an electrocardiogram representing electrical activity of the heart of a patient, the heart wall of the heart having an endocardium, a myocardium, and an epicardium;
identify an initial source location that is an endocardial source location or an epicardial source location;
calculate a normal vector that is normal to the heart wall at the initial source location;
access an activation time that is a time within an initial portion of a QRS complex of the electrocardiogram;
identify an activation vector based on a vector of a vectorcardiogram at the activation time, the vectorcardiogram being derived from the electrocardiogram;
calculate a depth angle representing the angle between the normal vector and the activation vector; and
generate a refined source location based on the initial source location and the depth angle; and
one or more processors for controlling the one or more computing systems to execute one or more of the computer-executable instructions and
performing a pulsed field ablation or a radiofrequency ablation on the patient that is informed based on the refined source location.

20. The method of claim 19 wherein the calculation of the normal vector is based on a segmentation of an image of the heart.

21. The method of claim 19 wherein the identification of the initial source location employs a source location identification system that inputs the electrocardiogram and outputs the initial source location.

22. The method of claim 21 wherein the source location identification system employs a machine learning model that is trained with feature vectors that each has a label, a feature vector having features that are derived from a training electrocardiogram and a label indicating an initial source location associated with that training electrocardiogram.

23. The method of claim 22 wherein the feature vectors are derived from electronic health records of patients.

24. The method of claim 19 wherein the one or more computer-readable storage mediums further include instructions to add an indication of the refined source location to a 3D graphic of the heart.

25. The method of claim 24 wherein the one or more computer-readable storage mediums further include instructions to generate a plurality of refined source locations based on plurality of cycles of one or more electrocardiograms and to add indication of the refined source locations to the 3D graphic.

26. The method of claim 19 wherein the refined source location is within the myocardium at a activation depth relative to initial source location, the activation depth being derived from the depth angle.

27. The method of claim 26 wherein the refined source location is along a line from the initial source location to a location on the other side of the heart wall that satisfies a nearness criterion based on the initial source location.

28. The method of claim 19 wherein the electrocardiogram is received from an electrocardiogram system and further including instructions to output the refined source location to an ablation system.

* * * * *